US012767164B2

(12) United States Patent
Forster et al.

(10) Patent No.: US 12,767,164 B2
(45) Date of Patent: Oct. 20, 2026

(54) METHOD AND SYSTEM FOR MONITORING DRIVER ATTENTION

(71) Applicant: Bayerische Motoren Werke Aktiengesellschaft, Munich (DE)

(72) Inventors: Yannick Forster, Munich (DE); Frederik Naujoks, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 25 days.

(21) Appl. No.: 19/087,770

(22) Filed: Mar. 24, 2025

(65) Prior Publication Data

US 2025/0296595 A1 Sep. 25, 2025

(30) Foreign Application Priority Data

Mar. 25, 2024 (DE) ..................... 10 2024 108 397.2

(51) Int. Cl.

*G08B 21/00* (2006.01)
*B60W 40/08* (2012.01)
*B60W 50/14* (2020.01)

(52) U.S. Cl.

CPC ............ *B60W 50/14* (2013.01); *B60W 40/08* (2013.01); *B60W 2040/0818* (2013.01);

(Continued)

(58) Field of Classification Search

CPC ................. B60W 50/14; B60W 40/08; B60W 2040/0818; B60W 2040/0881;

(Continued)

(56) References Cited

U.S. PATENT DOCUMENTS

2012/0046857 A1* 2/2012 Mori .......................... G06T 7/70 701/301
2013/0138392 A1* 5/2013 Kumon .................. B60K 35/23 702/152

(Continued)

FOREIGN PATENT DOCUMENTS

DE 10 2009 005 730 A1 7/2010
DE 10 2015 206 209 A1 10/2016
WO WO 2010/131331 A1 11/2010

OTHER PUBLICATIONS

"(R) Taxonomy and Definitions for Terms Related to Driving Automation Systems for On-Road Motor Vehicles", Surface Vehicle Recommended Practice, SAE (Society of Automotive Engineering) International, J3016™M, Sep. 2016, pp. 1-30 (30 pages).

(Continued)

*Primary Examiner* — Mark S Rushing
(74) *Attorney, Agent, or Firm* — Crowell & Moring LLP

(57) ABSTRACT

A method and automotive control unit is configured to monitor an attention of a driver of a vehicle. To this end, a gaze location of a driver of the vehicle is determined. If the gaze location corresponds to a rear-facing mirror, a field of view of the rear-facing mirror is determined. If the field of view corresponds to a view of a driving environment of the vehicle, the driver is classified as performing a driving task. If the field of view corresponds to a view of the vehicle, the driver is classified as performing a non-driving task. An attention alert is issued to the driver based on the classification of the driver.

18 Claims, 9 Drawing Sheets

(52) U.S. Cl.
CPC ............... *B60W 2040/0881* (2013.01); *B60W 2050/143* (2013.01); *B60W 2050/146* (2013.01); *B60W 2540/225* (2020.02); *B60W 2540/229* (2020.02)

(58) Field of Classification Search
CPC ..... B60W 2050/143; B60W 2050/146; B60W 2540/225; B60W 2540/229
USPC .......................................................... 340/576
See application file for complete search history.

(56) References Cited

U.S. PATENT DOCUMENTS

| | | | | |
|---|---|---|---|---|
| 2022/0319201 | A1* | 10/2022 | Li ........................ | G06V 20/597 |
| 2025/0242823 | A1* | 7/2025 | Camhi Espinoza .. | B60W 50/14 |

OTHER PUBLICATIONS

German-language Office Action issued in German Application No. 10 2024 108 397.2 dated Nov. 22, 2024 (10 pages).

* cited by examiner

METHOD AND SYSTEM FOR MONITORING DRIVER ATTENTION

CROSS REFERENCE TO RELATED APPLICATION

This application claims priority under 35 U.S.C. § 119 from German Patent Application No. 10 2024 108 397.2, filed Mar. 25, 2024, the entire disclosure of which is herein expressly incorporated by reference.

TECHNICAL FIELD

The invention generally relates to monitoring the attention of a driver of a vehicle and more precisely to preventing falsely determining that a driver is paying attention to the driving environment.

BACKGROUND AND SUMMARY

To determine the alertness of a driver, a modern vehicle typically employs a driver monitoring system (DMS), which determines whether the driver is monitoring the driving environment of the vehicle. For example, if a driver is looking at the dashboard of the vehicle or a screen arranged between a driver seat and a front passenger seat, the driver may be considered, i.e. classified, as performing a non-driving task, i.e. as performing a task not related to the dynamic driving task (DDT). When the driver looks into a rear-facing mirror, such as a rear-view mirror or a side-view mirror, the driver is typically classified by the DMS as performing a driving task since looking into a rear-facing mirror is typically considered as monitoring traffic behind and adjacent to the vehicle as part of the object and event detection and response (OEDR) subtask of the DDT. However, the driver may have repurposed the rear-facing mirror to monitor occupants of rear seats of the vehicle, in particular children seated in the rear seats. In such a case, the classification of the driver as performing a driving task when looking into the rear-facing mirror is erroneous since the driver is looking into the rear-view mirror not to monitor the driving environment but to monitor passengers in the rear seats.

Therefore, it is an objective of the present disclosure to prevent erroneous classification of a driver as performing a driving task when the driver looks into any one of the rear-facing mirrors of the vehicle after having repurposed any of the rear-facing mirrors of the vehicle for monitoring occupants of the rear seats of the vehicle.

To achieve this objective, the present disclosure provides a method for monitoring an attention of a driver of a vehicle. The method comprises determining a gaze location of a driver of the vehicle. If the gaze location corresponds to a rear-facing mirror, the method determines a field of view of the rear-facing mirror. If the field of view corresponds to a view of a driving environment of the vehicle, the method classifies the driver as performing a driving task. If the field of view corresponds to a view of the vehicle, the method classifies the driver as performing a non-driving task. Finally, the method issues an attention alert to the driver based on the classification of the driver.

The present disclosure further provides an automotive control unit. The automotive control unit comprises at least one processing unit and a memory coupled to the at least one processing unit and configured to store machine-readable instructions. The machine-readable instructions cause the at least one processing unit to determine a gaze location of a driver of a vehicle. If the gaze location corresponds to a rear-facing mirror, the machine-readable instructions cause the at least one processing unit to determine a field of view of the rear-facing mirror. If the field of view corresponds to a view of a driving environment of the vehicle, the machine-readable instructions cause the at least one processing unit to classify the driver as performing a driving task. If the field of view corresponds to a view of the vehicle, the machine-readable instructions cause the at least one processing unit to classify the driver as performing a non-driving task. Finally, the machine-readable instructions cause the at least one processing unit to issue an attention alert to the driver based on the classification of the driver.

The present disclosure further provides a vehicle comprising the automotive control unit.

Examples of the present disclosure will be described with reference to the following appended drawings, in which like reference signs refer to like elements.

It should be understood that the above-identified drawings are in no way meant to limit the present disclosure. Rather, these drawings are provided to assist in understanding the present disclosure. The person skilled in the art will readily understand that aspects of the present invention shown in one drawing may be combined with aspects in another drawing or may be omitted without departing from the scope of the present disclosure.

DETAILED DESCRIPTION OF THE DRAWINGS

The present disclosure generally provides a method, automotive control system and vehicle configured to monitor an attention of a driver of the vehicle. To this end, two verifications are performed. First, a gaze location of the driver is determined. If the gaze location corresponds to a rear-facing mirror, secondly a field of view of the rear-facing mirror is determined. Depending on whether the field of view of the rear-facing mirror corresponds to a driving environment of the vehicle, the driver is either classified as performing a driving task or as performing a non-driving task. That is, the second verification checks whether the rear-facing mirror is indeed used by the driver to monitor the driving environment or has instead been repurposed to monitor a passenger on a rear seat of the vehicle. If the rear-facing mirror has been repurposed to monitor a passenger on a rear seat of the vehicle, the driver is classified as performing a non-driving task. Based on the classification, an attention alert, such as an acoustic or combined visual and acoustic alert, is emitted inside the cabin of the vehicle to cause the driver to return to performing a driving task and in particular to return their view to the road ahead.

This general concept will be explained with reference to the appended drawings, with FIGS. 3A and 3B providing a flowchart of a method 200 for monitoring an attention of a driver of a vehicle and FIGS. 1A to 2B showing various examples of rear-facing mirrors with different fields of view. In addition, FIG. 4 illustrates a vehicle according to the present disclosure and FIG. 5 illustrates an automotive controller configured to perform method 200.

It will be understood that dashed boxes in FIG. 1 illustrate optional steps of method 100.

Figure 4:
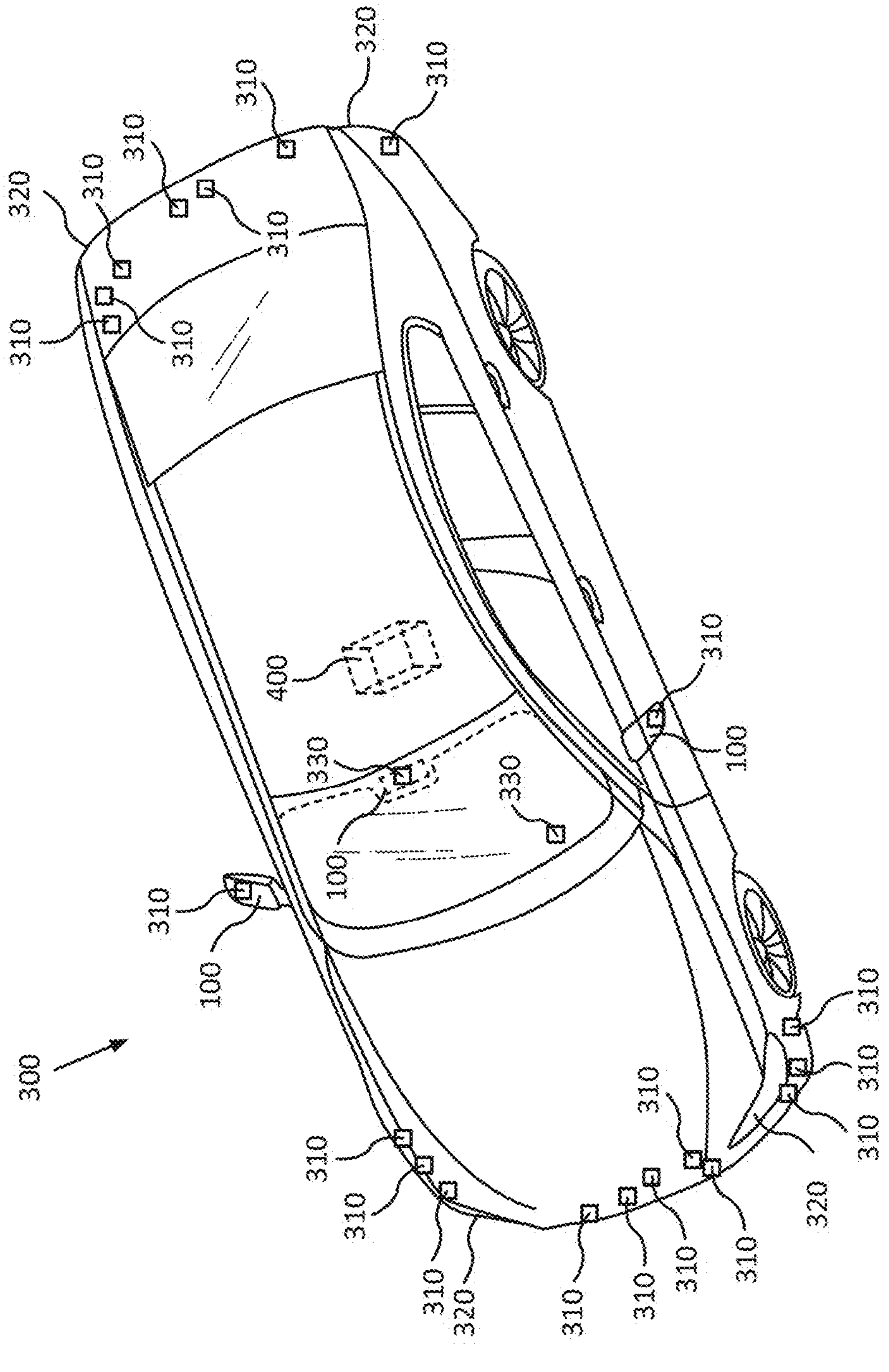
FIG. 4 illustrates a vehicle configured to monitor an attention of a driver of the vehicle according to examples of the present disclosure.
Figure 5:
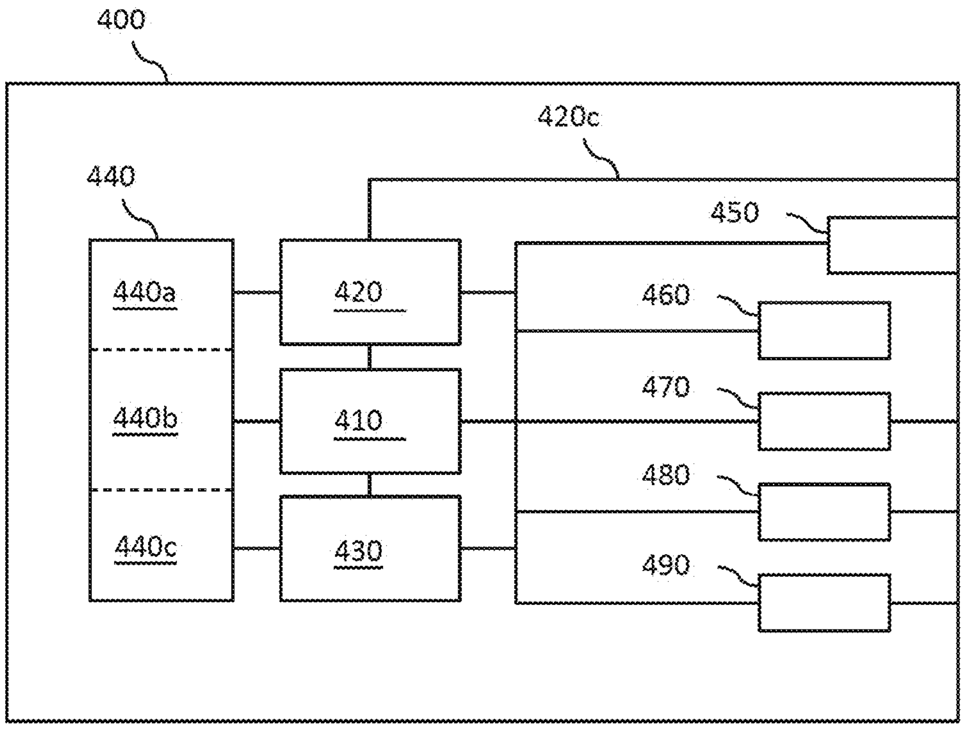
FIG. 5 illustrates an automotive control unit according to examples of the present disclosure.

Method 200 is configured to monitor an attention of a driver of a vehicle, such as vehicle 300 of FIG. 4.

Turning briefly to FIG. 2, vehicle 300 and more generally the expression vehicle in the context of the present disclosure refers to any kind of motor vehicle configured to transport people and/or freight. The motor of vehicle 300 may be any kind of motor, such as an electric motor or an internal combustion engine. Vehicle 300 may e.g. be a passenger vehicle as shown in FIG. 2. It will however be understood that vehicle 300 may also be a bus, a truck or any other kind of vehicle including one or more sensors 310 and an automotive control unit 300 enabling vehicle 300 to provide at least driver assistance. In other words, automotive control unit 300 and one or more sensors 310 may be configured to enable vehicle 300 to provide vehicle control functionality capable of at least driver assistance. i.e. level 1 of the driving automation taxonomy defined in standard J3016 of SAE International. That is, vehicle 300 may be configured to control at least one of the lateral motion and the longitudinal motion of vehicle 300 based on automotive sensor data provided by one or more sensors 310 under the supervision of a driver of vehicle 300.

It will be understood vehicle 300 may be configured to enable higher levels of driving automation, such as partial driving automation, i.e. level 2 or higher of the driving automation taxonomy defined in standard J3016 of SAE International.

The one or more sensors 310 are configured to capture automotive sensor data indicative of the environment of vehicle 300. Accordingly, the automotive sensor data provide environmental awareness to the one or more vehicle control modules and thereby to vehicle 300 in order to enable at least driver assistance. For example, the automotive sensor data captured by the one or more sensors 310 may provide vehicle 300 with information on the position and size of other vehicles, road surface markings or traffic signs. To this end, the one or more sensors 310 may be radar sensors, which may be configured to emit radio waves in order to determine a distance, an angle and a velocity of objects around the vehicle based on the reflected radio waves. The one or more sensors 310 may be light detection and ranging (LIDAR) sensors, which are configured to emit laser beams in order to determine a distance, an angle and a velocity of objects around vehicle 300 based on the reflected laser beams. The one or more sensors 310 may be cameras, which capture images of the environment of the vehicle. The one or more sensors 310 may be thermographic cameras, which capture images of the environment of vehicle 300 based on infrared radiation. It will be understood that LIDAR sensors, radar sensors or cameras are merely provided as examples of sensor types of the one or more sensors 310. For example, the one or more sensors 310 may also be ultrasonic sensors. The one or more sensors 310 may be global navigation satellite system (GNSS) sensors configured to receive positional data, such as satellite signals, for determining the position of vehicle 200. More generally, the one or more sensors 310 may be any type of sensor capable of capturing automotive sensor data indicative of the environment of vehicle 200. It will further be understood that the one or more sensors 310 may include multiple sensors of various types of sensors. Further, the one or more sensors 310 of the same type may exhibit different properties, e.g. by being configured to capture sensor data at different ranges, such as a close range, a middle range and a far range. For example, vehicle 300 may include three close range radar sensors each at a front and a back of vehicle 300, a middle range to far range radar sensor at the back of vehicle 200, a LIDAR sensor at the front of vehicle 300, a rear-facing camera at the back of vehicle 200, a front-facing camera at the front of the vehicle, a front-facing camera at the rearview mirror and a rear-facing close range to middle range radar sensor in each door-mounted outer rear view mirror. It will be understood that vehicle 300 may include more or fewer automotive sensors than shown in FIG. 4 and discussed in the above example.

Vehicle 300 further comprises one or more interior sensors 330, which are configured to capture interior data indicative of at least a behavior of the driver. The behavior of the driver includes at least a gaze location of the driver and may include further behavior elements indicative of an attention of the driver of vehicle 300, such as an eye aperture or objects in the hands of the driver. To this end, the one or more interior sensors 330 may be cameras, which capture images of at least the driver, or may be thermographic cameras, which capture images of at least the driver based on infrared radiation or may be any other type of sensor configured to capture the interior data. It will be understood that the interior data may be captured by a single interior sensor 330 as well as a plurality of interior sensors 330, which may be of the same or different sensor types in order to capture the interior data of the driver from various angles and/or based on a combination of sensor types. The one or more interior sensors 330 may be integrated into an instrument cluster behind the steering wheel, arranged adjacent to the rearview mirror or located in any other location enabling capturing of the interior data.

In the context of the present disclosure, the attention of the driver refers to the driver focusing entirely or at least predominantly on performing driving tasks, i.e. tasks related to the dynamic driving task (DDT), as defined in standard J3016 of SAE International. Accordingly, driving tasks include all of the real-time operational and tactical tasks required to operate a vehicle in on-road traffic, excluding the strategic functions such as trip scheduling and selection of destinations and waypoints, and including, without limitation, lateral vehicle motion control via steering, longitudinal vehicle motion control via acceleration and deceleration, monitoring the driving environment via object and event detection, recognition, classification, and response preparation, object and event response execution, maneuver planning and enhancing conspicuity via lighting, sounding the horn, signaling, gesturing, etc. The subtasks of monitoring the driving environment via object and event detection, recognition, classification and response preparation as well as object and event response execution are collectively referred to as object and event detection and response (OEDR). Consequently, OEDR as defined in standard J3016 of SAE International is to be understood as monitoring the driving environment and executing an appropriate response to such objects and events as part of the DDT. While attention of the driver in the context of the present disclosure refers to the driver focusing entirely or at least predominantly on performing driving tasks, the present disclosure focuses on whether the driver is monitoring the driving environment when looking into rear-facing mirrors. Accordingly, attention of the driver in the context of the present disclosure particularly refers to whether the driver performs driving tasks which correspond to OEDR subtasks of the DDT.

In step 210, method 200 determines a gaze location of a driver of vehicle 300. To this end, method 200 may employ interior sensors 330 and more precisely the interior data captured by interior sensors 330. For example, the interior data may indicate one or more head pose angles, e.g. yaw, pitch and roll, of the head of the driver, based on which method 200 may, as part of step 210, derive the gaze location using the known location of the one or more interior sensors 330. In addition to or instead of the head pose angles, the interior data may indicate the position of the eyes of the driver to derive the gaze location. If for example both the position of the eyes and the head pose angles are used to derive the gaze location, method 200 may in step 210 determine a gaze vector in a coordinate system, which may e.g. be centered on the head of the driver or a fixed position of the cabin of vehicle 300 in order to determine the gaze location. If more than one interior sensor 330 is used, the gaze location may also be determined based on triangulation, i.e. based on the known positions of the various interior sensors 330 and the gaze vectors determined by each interior sensor 330. It will be understood that theses examples of the determination of the gaze location are merely provided as examples. The gaze location may be determined in any way suitable for the monitoring of the attention of the driver in view of the employed one or more interior sensors 330 and the data captured by the one or more sensors 330.

Method 200 then proceeds to determine in step 211 whether the gaze location corresponds to a rear-facing mirror 100. In the context of the present disclosure, rear-facing mirror refers to any kind of mirror enabling the driver of vehicle 300 to monitor the driving environment adjacent to and behind vehicle 300, such as the side-view mirrors or the rearview mirror of vehicle 300. It will thus be understood that vehicle 300 may typically include at least three rear-facing mirrors 100 and any reference to the rear-facing mirror 100 may likewise be understood to include any subset or all of the rear-facing mirrors 100 of vehicle 300. As discussed with regard to step 210, method 200 may determine in step 211 that the gaze location corresponds to one of the rear-facing mirrors 100 e.g. based on the gaze vector in the coordinate system centered on a fixed location of the cabin of vehicle 300 and the known position of the one of the rear-facing mirrors 100 within the coordinate system or based on deriving from the head pose angles that the driver is most likely looking at one of the rear-facing mirrors.

Figure 3A:
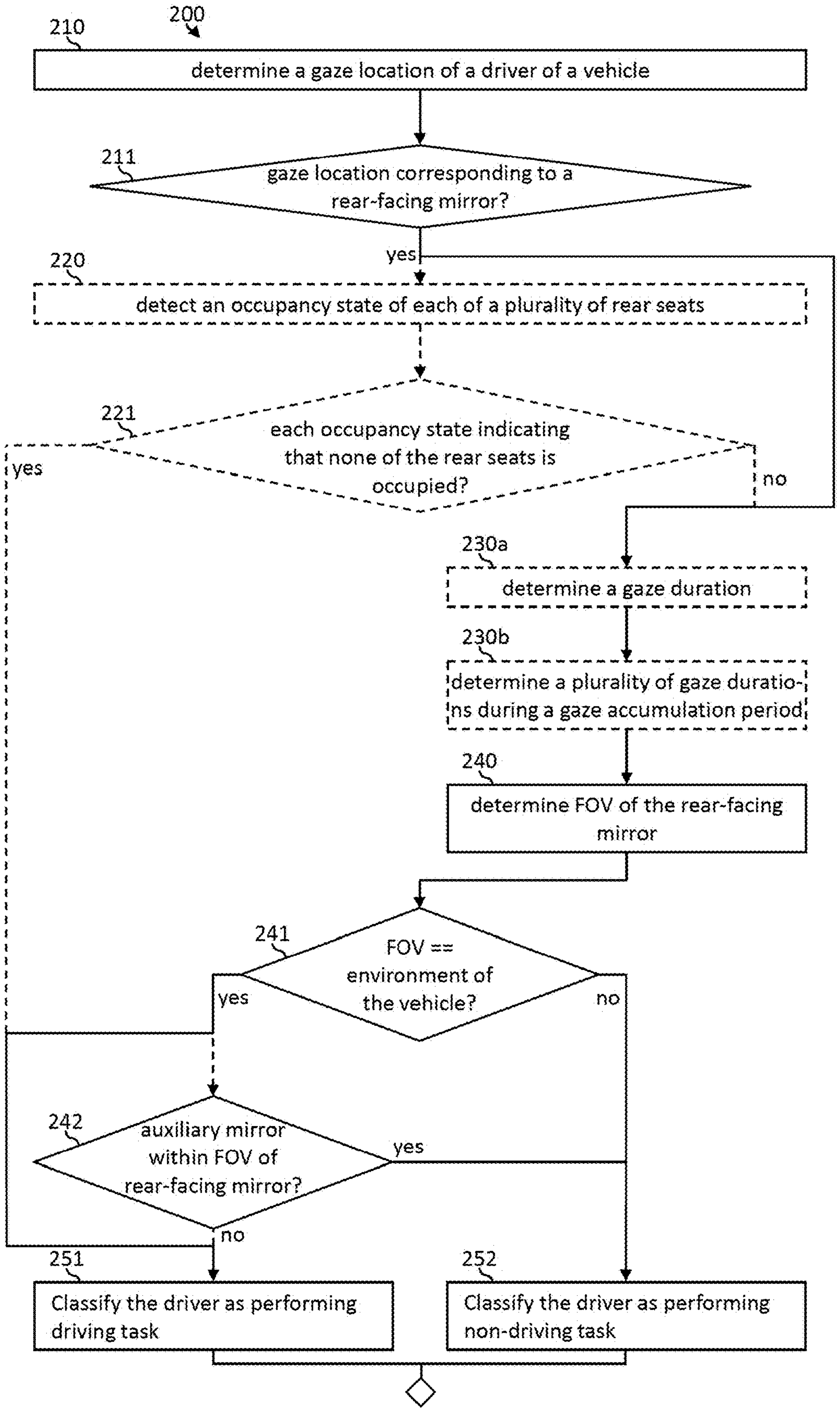
FIGS. 3A and 3B show a flowchart of a method for monitoring an attention of a driver of a vehicle according to examples of the present disclosure.

If method 200 determines in step 211 that the gaze location corresponds to the rear-facing mirror 100, method 100 may proceed to steps 230*a* through 252, as illustrated in FIG. 3A. However, in some examples of the present disclosure method 200 may first proceed to step 220 after the determination that the gaze location corresponds to the rear-facing mirror 100. In step 220, method 200 may detect an occupancy state of each of a plurality of rear seats 120 of vehicle 300. Each occupancy state may indicate an occupancy of the corresponding rear seat 120. That is, method 200 may detect whether any one of rear seats 120 is occupied by a passenger. If none of the rear seats 120 is occupied by a passenger, method 200 may assume that there is no reason for the driver of vehicle 300 to repurpose any of the rear-facing mirrors 100 of vehicle 300. Accordingly, method 200 may directly proceed to step 251 in order to classify the driver as performing a driving task. In other words, method 200 may in particular forego step 240 if repurposing of the one or more rear-facing mirrors is not to be expected given the absence of passengers in the rear seats 120 of vehicle 300.

Depending on the implementation of method 200, method 200 may proceed to step 230*a* to determine a gaze duration, which corresponds to a time interval during which the gaze location corresponds to one of the rear-facing mirrors 100 subsequent to determining that the gaze location corresponds to one of the rear-facing mirrors in step 211 or subsequent to detecting that none of rear seats 120 is occupied in step 221. In addition to or instead of step 230*a*, method 200 may also perform step 230*b*, in which method 200 may determine a plurality of gaze durations during a gaze accumulation period. In other words, method 200 may determine the duration of a single gaze into one of the rear-facing mirrors 100 or the accumulated duration of multiple gazes into one of the rear-facing mirrors 100 over a pre-determined time period, i.e. the gaze accumulation period. Since the driver is not paying attention to the road ahead of vehicle 300 while looking into one of the rear-facing mirrors 100, a driver looking into one of the rear-facing mirrors 100 over an extended period of time may be considered as inattentive even when monitoring the driving environment of vehicle 300 via the one or more rear-facing mirrors 100. Accordingly, an attention alert may be issued to the driver as part of step 260 also based on the gaze duration and/or the accumulated gaze durations, as will be subsequently discussed.

It will be understood that both steps 230*a* and 230*b* may be performed simultaneously in order to determine whether individual gaze durations as well as an accumulated gaze duration as the sum of the plurality of gaze durations may lead to the driver being considered inattentive. It will further be understood that steps 230*a* and 230*b* may also be performed subsequent to step 240, e.g. if the driver is classified as performing a driving task in step 251, since method 200 may otherwise not issue the attention alert to the driver as part of step 260 in view of the classification in step 251. It will further be understood that steps 230*a* and 230*b* may be performed subsequent to step 220 and 221, i.e. the gaze duration and/or accumulated gaze durations may be determined following the determination that none of rear seats 120 are occupied since the gaze duration and/or accumulated gaze durations may be used in step 260 even if method 200 foregoes steps 240 to 242 as a consequence of the lack of detection of occupants in the rear seats 120 in step 221.

In step 240, method 200 determines a field of view of rear-facing mirror 100, i.e. an environment observable within rear-facing mirror 100 from the vantage point of the driver of vehicle 300. Method 300 may determine the field of view of the rear-facing mirror 100 e.g. based on sensors of vehicle 100, such as one of the interior sensors 330 in the case of rear-facing mirror 100 being a rearview mirror or one of automotive sensors 310 in the case of the rear-facing mirror 100 being a sideview mirror. Method 200 may also determine the field of view based on an angle at which rear-facing mirror 100 is arranged with regard to a mounting surface of rear-facing mirror 100, e.g. based on known fields of view at the angle or based on calculating an expected field of view based on the angle.

Based on the field of view determined in step 240, method 200 determines in step 241 whether the field of view corresponds to a view of the driving environment of vehicle 300. The field of view corresponds to the view of the driving environment of vehicle 300 if the field of view includes less of a view of vehicle 300 than a vehicle view threshold. More precisely, the field of view of rear-facing mirror 100 always includes at least some elements of vehicle 300, which form the view of vehicle 300 in addition to the view of the driving environment.

Figure 1A:
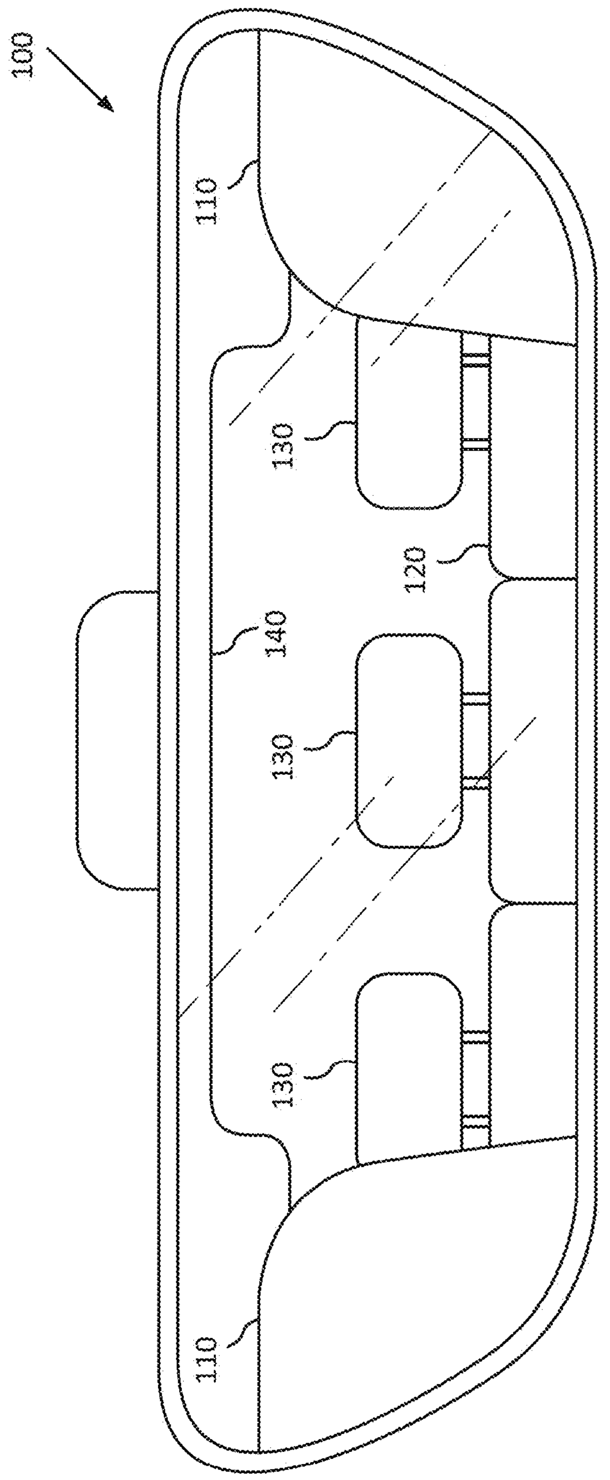
FIGS. 1A to 1C show a rearview mirror as an example of a rear-facing mirror with various fields of view according to examples of the present disclosure.

The concept of the field of view of rear-facing mirror 100 is illustrated in FIG. 1A, which illustrates the field of view of rear-facing mirror 100 implemented as a rear-view mirror. The field of view shown in FIG. 1A includes elements of vehicle 300 in the form of a part of a vehicle ceiling 140, a part front seat head rests 110, a part of rear seats 120 and rear seat head rests 130. The driving environment in FIG. 1A is visible through the rear window behind rear seat head rests 130. FIG. 1A illustrates a typical field of view of a rear-view mirror, i.e. the field of view used by the driver of vehicle 300 to monitor the driving environment behind vehicle 300. Based on this typical field of view, the vehicle view threshold in the context of the present disclosure may be defined as the percentage of vehicle elements visible in the typical field of view, thereby taking into account e.g. the geometry of vehicle ceiling 140, the front-seat head rests 110, the rear seats 120, rear-seat head rests 130 and the rear window of vehicle 300 as well as of any other vehicle elements which may be visible in the field of view of rear-facing mirror 100.

Figure 1B:
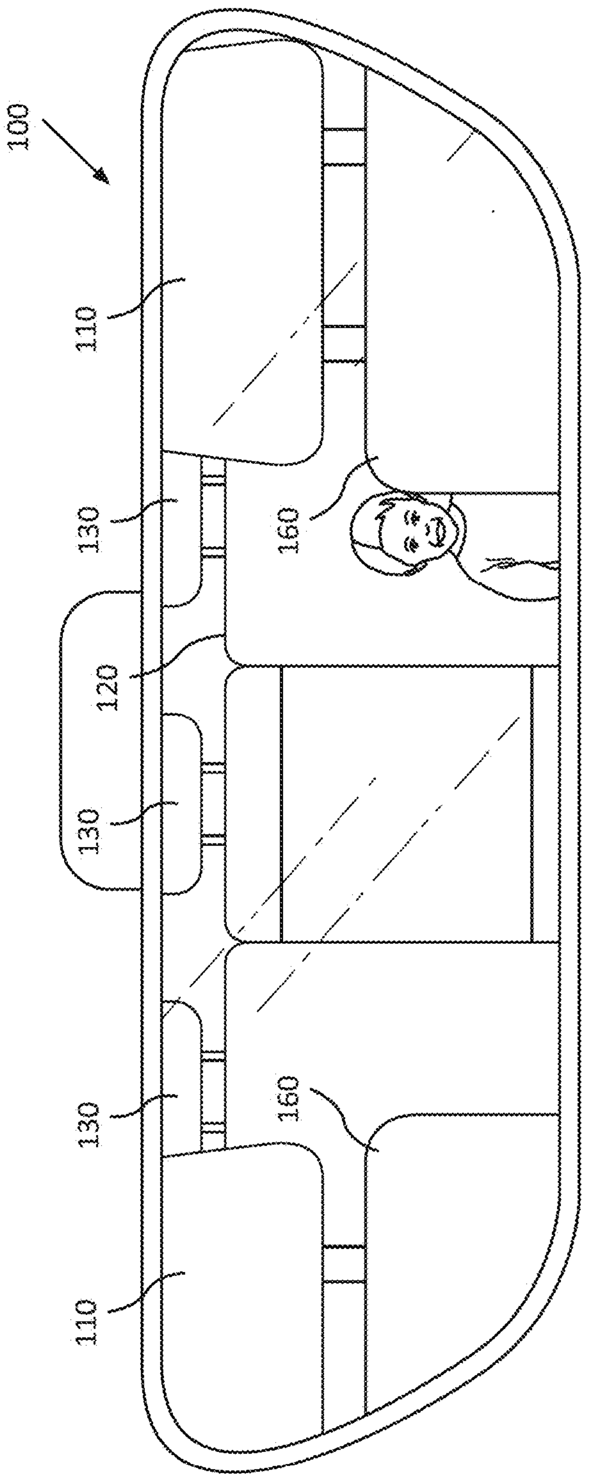

Consequently, if the percentage of vehicle elements in the field of view of rear-facing mirror 100 exceeds the vehicle view threshold as determined based on the typical field of view of rear-facing mirror 100, the field of view of rear-facing mirror 100 is considered to correspond to a vehicle view, as shown in FIG. 1B. In FIG. 1B, the driving environment is barely visible above the rear seats 120 in the field of view of the exemplary rearview mirror of FIG. 1B and the percentage of vehicle elements is greatly increased as the driver has repurposed the rear-view mirror of FIG. 1B to enable monitoring a child on one of the rear seats 120. Accordingly, the field of view of the rear-view mirror of FIG. 1B corresponds to the view of vehicle 300.

Figure 2A:
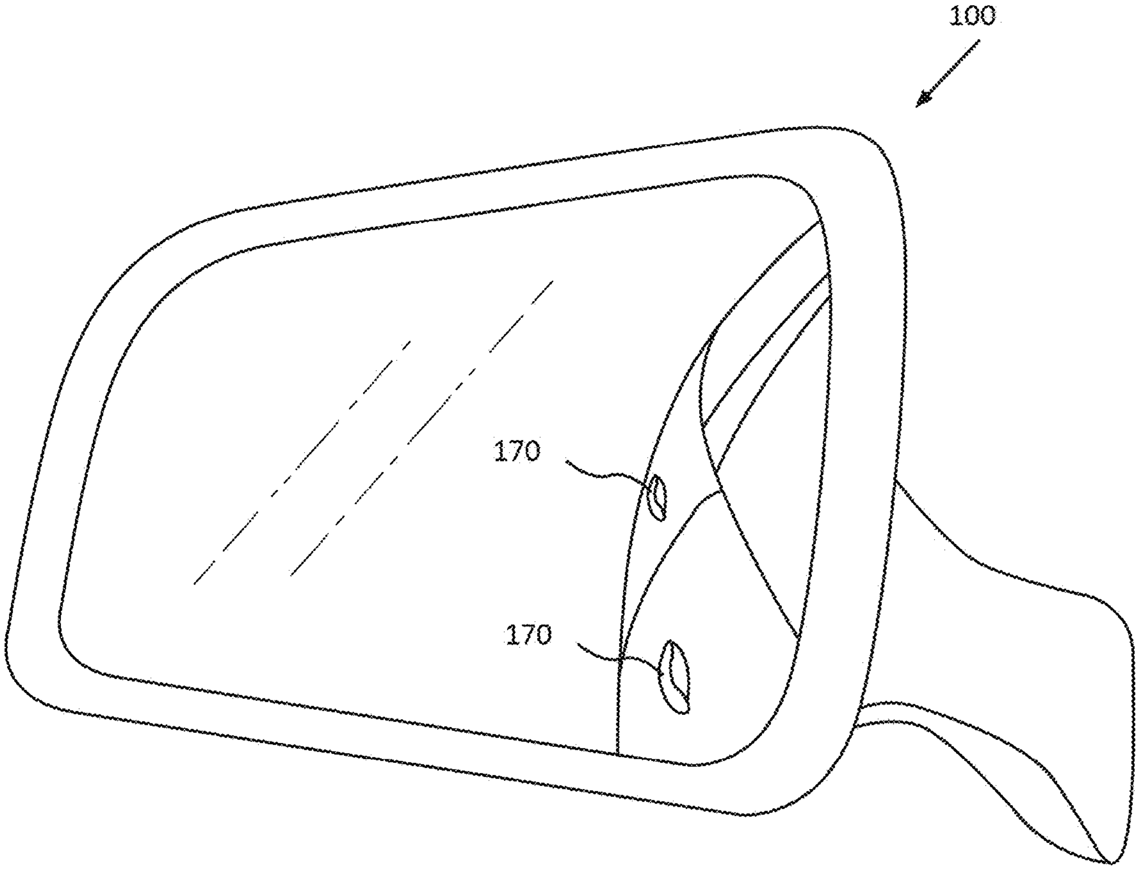
FIGS. 2A and 2B show a sideview mirror as an example of a rear-facing mirror with various fields of view according to examples of the present disclosure.
Figure 2B:
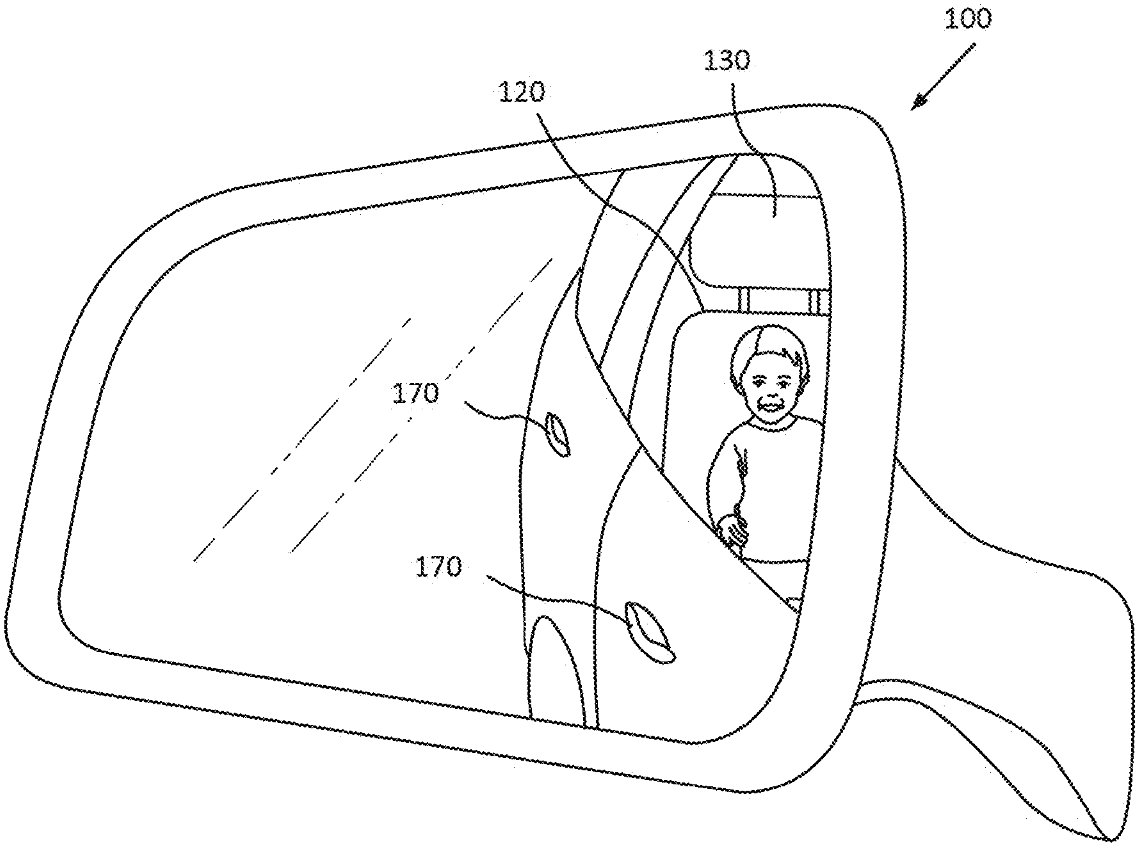
Figure 3B:
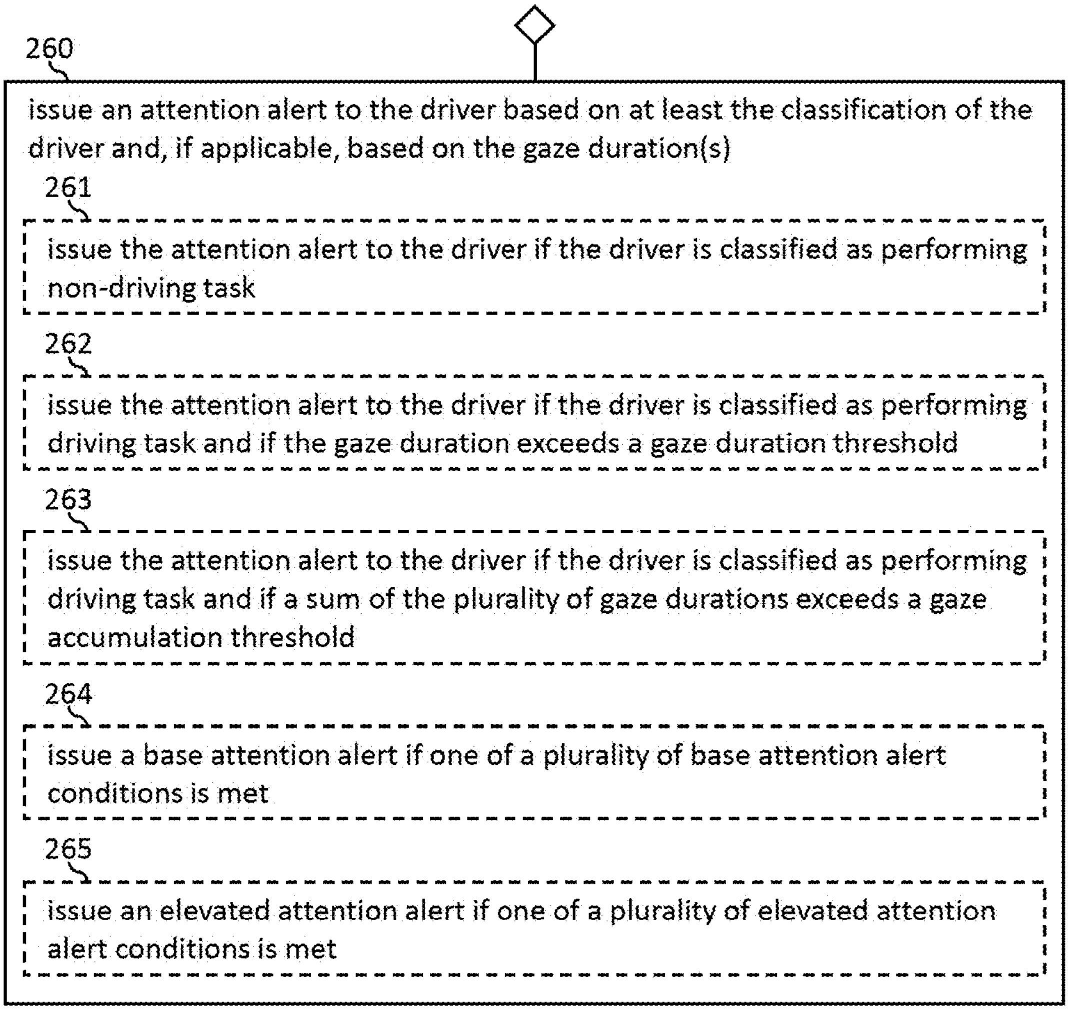

The concept of the view of the driving environment compared to the view of vehicle 300 is further illustrated with an example side-view mirror in FIGS. 2A and 2B. FIG. 2A shows the example side-view mirror with a typical field of view of the side-view mirror, which includes door handles 170 as well as parts of the doors and the side windows of vehicle 300 as well as the driving environment adjacent to vehicle 300. The percentage of the field of view of the side-view mirror of FIG. 2A, which includes these vehicle elements of vehicle 300 in the typical field of view of the side-view mirror of FIG. 2A, defines the vehicle view threshold for the side-view mirror of FIG. 2A. By contrast, FIG. 2B shows the field of view of the side-view mirror of FIG. 2A after side-view mirror has been repurposed to monitor a child on one of rear seats 120. As can be seen in FIG. 2B, more elements of vehicle 300 are at least partially visible in the field of view of the side-view mirror of FIG. 2B, such as rear seat head rest 130, than in the field of view, i.e. the typical field of view, of the side view mirror of FIG. 2A. Consequently, the percentage of the field of view corresponding to the view of vehicle 300 is greatly increased in FIG. 2B compared to FIG. 2A and the field of view of the side-view mirror of FIG. 2B is therefore considered to correspond to the view of vehicle 300 instead to the view of the driving environment.

In summary, method 200 may determine in step 241 whether the field of view corresponds to the view of the driving environment or the view of vehicle 300 based on the vehicle view threshold, which corresponds to the percentage of the typical field of view of rear-facing mirror 100 which includes elements of vehicle 300. The typical field of view, as e.g. illustrated in FIG. 1A for the exemplary rear-view mirror and in FIG. 2A for the exemplary side-view mirror, corresponds to the typical field of view of rear-facing mirror 100 which enables monitoring the driving environment behind and/or adjacent to vehicle 300. The typical field of view and the corresponding vehicle view threshold may be determined by a vehicle manufacturer based on an average adjustment of rear-facing mirror 100 and potentially one or more standard deviations of the average adjustment of rear-facing mirror 100. The typical field of view and the corresponding vehicle view threshold may also be determined for the driver of vehicle 300 upon initial setup of vehicle 300 or each time vehicle 300 detects an unknown driver of vehicle 300 based on the interior data of one of the interior sensors 330.

If the field of view corresponds to the view of the driving environment of vehicle 300, method 200 may proceed to step 251 to classify the driver as performing the driving task. If the field of view corresponds to the view of vehicle 300, method 200 may proceed to step 252 to classify the driver as performing the non-driving task, i.e. any type of task not related to any subtask of the DDT.

Figure 1C:
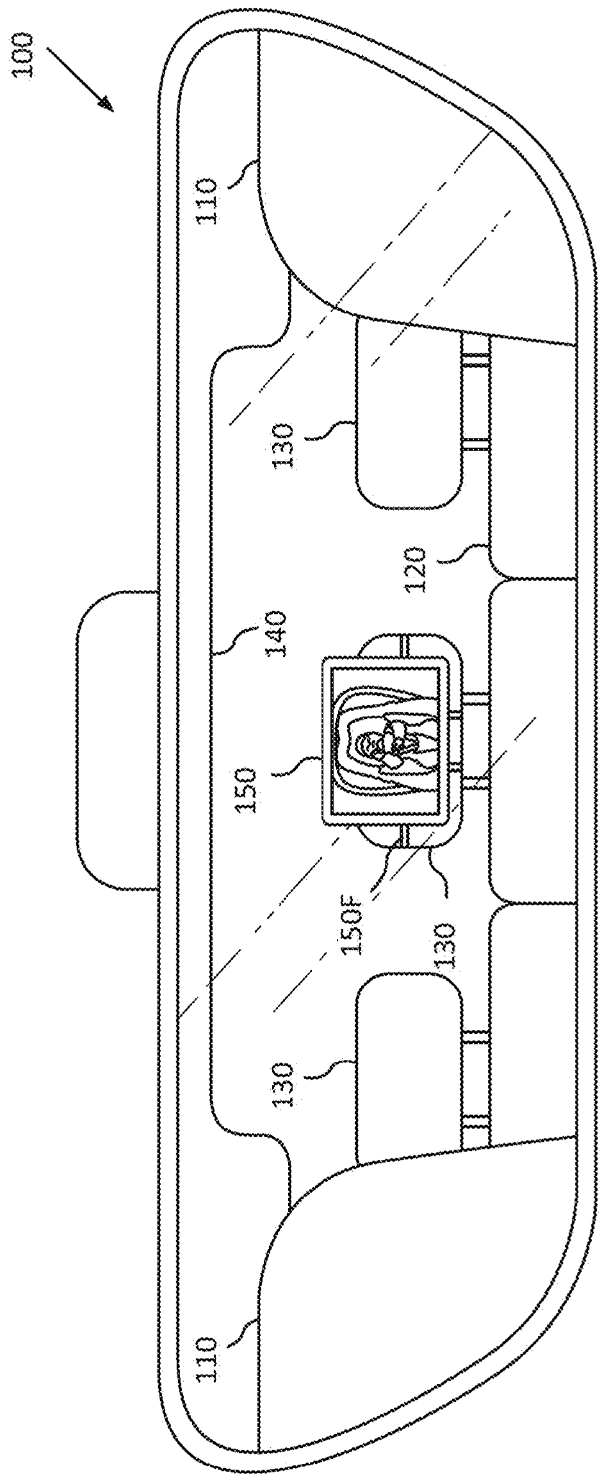

If the field of view corresponds to the view of the driving environment of vehicle 300, method 200 may perform step 242 prior to proceeding to step 251 from step 241. In step 242, method 200 may detect an auxiliary mirror within the field of view the rear-facing mirror 100. The auxiliary mirror may have an auxiliary field of view, which includes at least one rear seat 120. That is, method 200 may check in step 242 whether the driver 200 has repurposed rear-facing mirror 100 to monitor occupants of rear-seats 120. This concept is shown in FIG. 1C, which shows the same field of view of the rear-view mirror as FIG. 1A but with an auxiliary mirror 150 attached via auxiliary mirror fastening means 150F to one of the rear seat head rests 130. As can be seen in FIG. 1C, the auxiliary field of view of auxiliary mirror 150 includes an infant located in an infant car seat attached to one of the rear seats 120. Accordingly, even though the field of view of the rear-view mirror of FIG. 1C corresponds to the field of view of the rear-view mirror of FIG. 1A and thus to the typical field of view of the rear-view mirror as discussed above, the driver of vehicle 300 has nonetheless repurposed the rear-view mirror of FIG. 1C in order to monitor the infant. Thus, method 200 may in step 242 verify whether the driver has repurposed rear-facing mirror 100 without having changed the field of view from the typical field of view. Consequently, method 200 may, as a consequence of the detection of auxiliary mirror 150 in step 242, proceed to step 252 in order to classify the driver as performing the non-driving task despite the field of view corresponding to the typical field of view and thus to the view of the driving environment of vehicle 300 as determined in step 241.

After the driver has been classified as either performing the driving-task or the non-driving task in steps 251 and 252, method 200 proceeds to step 260, in which method 200 issues an attention alert to the driver based on the classification of the driver. The attention alert may be any kind of signal which at least alerts the driver to return to performing the driving task. Accordingly, step 260 may include a step 261, in which method 200 issues the attention alert to the driver if the driver is classified as performing the non-driving task.

The attention alert may be any kind of optical and/or visual alert emitted inside the cabin of vehicle 300, such as a sound, a voice message instructing the driver to pay attention to the DDT/OEDR subtask, a flashing icon in the instrument cluster of vehicle 300 and/or on a head-up display of vehicle 300 or any other kind of alert causing the driver to return to performing the driving task.

In addition to being a signal at least alerting the driver to return to performing the driving task, the attention alert may further alert the driver to return to monitoring the driving environment ahead of vehicle 300. To this end, issuing the attention alert to the driver in step 260 may further be based on the gaze duration and more precisely on the gaze duration and/or the accumulated gaze duration. In other words, based on the gaze duration and/or the accumulated gaze duration determined in steps 230*a* and 230*b*, step 260 may include one or both of steps 262 and 263.

In step 262, method 200 may as part of step 260 issue the attention alert to the driver if the driver is classified as performing the driving task and if the gaze duration exceeds a gaze duration threshold, i.e. a time period after which the attention of the driver should return to monitoring the road ahead of vehicle 300.

In step 263, method 200 may as part of step 260 issue the attention alert to the driver if the driver is classified as performing the driving task and if the sum, i.e. the accumulated gaze duration, of the plurality of gaze durations during the gaze accumulation period exceeds a gaze accumulation threshold. In other words, method 200 may issue the attention alert to the driver if the driver looks into rear-facing mirror for short periods of time, which individually are not considered to constitute excessive breaks in the monitoring of the road ahead but in sum over the accumulation period do constitute a combined excessive break in the monitoring of the road ahead.

Method 200 may further issue different types of attention alerts as part of step 260 based on different levels of distraction of the driver as determined based on the classification of the driver and the gaze duration and/or accumulated gaze durations. The different types of attention alert may be similar to the attention alert discussed above but may vary in intensity depending on the level of the different types of attention alert.

To this end, step 260 may include a step 264, in which method 200 may issue a base attention alert if one of a plurality of base attention alert conditions is met. The plurality of base attention alert conditions may comprise at least a first base alert condition and a second base alert condition. The first base alert condition comprises the driver being classified as performing the driving task and the gaze duration exceeding the gaze duration threshold and/or the sum of the plurality of gaze durations during the gaze accumulation period exceeds the gaze accumulation threshold. The second base alert condition may comprise the driver being classified as performing the non-driving task. In other words, the base attention alert may correspond to the attention alert as issued in steps 261 and 262, i.e. the base attention alert may be issued if the driver is classified as performing the non-driving task or if the driver is classified as performing the driving task but spends too much time monitoring the driving environment behind vehicle 300 and/or adjacent to vehicle 300 via rear-facing mirror 100.

In addition to step 264, step 260 may further include step 265, in which method 200 issues an elevated attention alert if one of a plurality of elevated attention alert conditions is met. The plurality of elevated attention alert conditions may comprise at least a first elevated attention alert condition. The first elevated attention alert condition may comprise the driver being classified as performing the non-driving task and the gaze duration exceeding the gaze duration threshold or the sum of the plurality of gaze durations during the gaze accumulation period exceeding the gaze accumulation threshold. In other words, method 200 may issue the elevated attention alert if the driver is classified as performing the non-driving task and does not monitor the road ahead of vehicle 300 for extended periods of time. The elevated attention alert may in such a situation be warranted given that the driver is already assumed to be distracted due to the repurposing of rear-facing mirror 100 and further does not pay attention to the road ahead for at least the time period defined by the gaze duration threshold and/or the gaze accumulation threshold.

It will be understood that the plurality of base alert conditions and the plurality of elevated attention alert conditions may comprise further conditions than discussed above with regard to steps 264 and 265.

In summary, method 200 determines whether the driver of vehicle 300 has repurposed rear-facing mirror 100 and accordingly classifies the driver as performing the driving task, i.e. a task related to the DDT/OEDR subtask, or the non-driving task, i.e. any task not related to the DDT/OEDR subtask when looking into rear-facing mirror 100. Additionally, method 300 may monitor the duration of individual gazes as well as the accumulated duration of multiple gazes over a pre-defined time period in order to determine whether the driver should return to monitoring the driving environment ahead of vehicle 300 even when performing the driving task and may further increase the intensity of the alert issued to the driver not performing the driving task.

FIG. 5 shows automotive control unit 400 configured to perform method 200. automotive control unit 400 may include a processor 410, a graphics processing unit (GPU) 420, automotive processing system 430, a memory 440, a removable storage 450, a storage 460, a cellular interface 470, a global navigation satellite system (GNSS) interface 480 and a communication interface 490.

Processor 410 may be any kind of single-core or multi-core processing unit employing a reduced instruction set (RISC) or a complex instruction set (CISC). Exemplary RISC processing units include ARM based cores or RISC V based cores. Exemplary CISC processing units include x86 based cores or x86-64 based cores. Processor 410 may perform instructions causing automotive control unit 400 to perform method 200. Processor 410 may be directly coupled to any of the components of automotive control unit 400 or may be directly coupled to memory 430, GPU 420 and a device bus.

GPU 420 may be any kind of processing unit optimized for processing graphics related instructions or more generally for parallel processing of instructions. As such, GPU 420 may be configured to generate a display of information, such as ADAS information or telemetry data, to a driver of the vehicle, e.g. via a head-up display (HUD) or a display arranged within the view of the driver. GPU 420 may be coupled to the HUD and/or the display via connection 420C. GPU 420 may further perform at least a part of method 100 to enable fast parallel processing of instructions relating to method 100. It should be noted that in some embodiments, processor 410 may determine that GPU 420 need not perform instructions relating to method 200. GPU 420 may be directly coupled to any of the components of automotive control unit 400 or may be directly coupled to processor 410 and memory 430. In some embodiments, GPU 420 may also be coupled to the device bus.

Automotive processing system 430 may be any kind of system-on chip configured to provide trillions of operations per second (TOPS) in order to enable automotive control unit 400 to implement one or more ADAS while driving. Automotive processing system 430 may interface only with processor 410 or may interface with other devices via the system bus. Automotive processing system 430 may for example perform the instructions related to the one or more automotive sensor data processing modules and to the one or more vehicle control modules.

Memory 440 may be any kind of fast storage enabling processor 410, GPU 420 and automotive processing system 430 to store instructions for fast retrieval during processing of instructions as well as to cache and buffer data. Memory 440 may be a unified memory coupled to processor 410 and GPU 420 and automotive processing system 430 in order to enable allocation of memory 440 to processor 410, GPU 420 and automotive processing system 430 as needed. Alternatively, processor 410, GPU 420 and automotive processing system 430 may be coupled to separate processor memory 440*a*, GPU memory 440*b* and automotive processing system memory 440*c*.

Removable storage 450 may be a storage device which can be removably coupled with automotive control unit 400. Examples include a digital versatile disc (DVD), a compact disc (CD), a Universal Serial Bus (USB) storage device, such as an external SSD, or a magnetic tape. It should be noted that removable storage 450 may store data, such as instructions of method 200, automotive sensor data, intermediate data and/or vehicle control data or may be omitted.

Storage 460 may be a storage device enabling storage of program instructions and other data. For example, storage 460 may be a hard disk drive (HDD), a solid state disk (SSD) or some other type of non-volatile memory. Storage 460 may for example store the instructions of method 100, automotive sensor data, intermediate data and/or vehicle control data.

Removable Storage 450 and storage 460 may be coupled to processor 410 via the system bus. The system bus may be any kind of bus system enabling processor 410 and optionally GPU 420 as well as automotive processing system 430 to communicate with the other devices of automotive control unit 400. Bus 440 may for example be a Peripheral Component Interconnect express (PCIe) bus or a Serial AT Attachment (SATA) bus.

Cellular interface 470 may be any kind of interface enabling automotive control unit 400 to communicate via a cellular network, such as a 4G network or a 5G network.

GNSS interface 480 may be any kind of interface enabling automotive control unit 300 to receive positional data provided by a satellite network, such as the Global Positioning System (GPS), the Global Navigation Satellite System (GLONASS) or Galileo. The positional data may be one of the types of automotive sensor data in the context of the present disclosure.

Communications interface 490 may enable automotive control unit 400 to interface with external devices, either directly or via network. Communications interface 480 may for example enable automotive control unit 300 to couple to a wired or wireless network, such as Ethernet, Wifi, a Controller Area Network (CAN) bus or any bus system appropriate in vehicles. For example, automotive control unit 400 may be coupled to the one or more automotive sensors 310 to receive automotive sensor data.

Automotive control unit 400 may be integrated with vehicle 300, e.g. beneath the cabin, under the dashboard or in the trunk of vehicle 300.

The invention may further be illustrated by the following examples.

In an example, a method for monitoring an attention of a driver of a vehicle comprises determining a gaze location of a driver of the vehicle and if the gaze location corresponds to a rear-facing mirror, determining a field of view of the rear-facing mirror, if the field of view corresponds to a view of a driving environment of the vehicle, classifying the driver as performing a driving task, if the field of view corresponds to a view of the vehicle, classifying the driver as performing a non-driving task and issuing an attention alert to the driver based on the classification of the driver.

In the example method, the field of view may correspond to the view of the driving environment of the vehicle if the field of view includes less of the view of the vehicle than a vehicle view threshold.

The example method may further comprise, if the gaze location corresponds to the rear-facing mirror, detecting an occupancy state of each of a plurality of rear seats of the vehicle, each occupancy state indicating an occupancy of each corresponding rear seat, and classifying the driver as performing the driving task if each occupancy state indicates that none of the rear seats of the plurality of rear seats is occupied.

In the example method, the example method may forego determining the field of view if each occupancy state indicates that none of the rear seats of the plurality of rear seats is occupied.

In the example method, the determining the field of view of the rear-facing mirror may comprise detecting an auxiliary mirror within the field of view the rear-facing mirror, the auxiliary mirror having an auxiliary field of view including at least one rear seat, and the example method may further comprise classifying the driver as performing the non-driving task even if the field of view corresponds to the view of the driving environment of the vehicle if the auxiliary mirror is detected.

In the example method, the issuing the attention alert to the driver may include issuing the attention alert to the driver if the driver is classified as performing the non-driving task.

The example method may further comprise, if the gaze location corresponds to a rear-facing mirror, determining a gaze duration, the gaze duration corresponding to a time interval during which the gaze location may correspond to the rear-facing mirror, wherein the issuing the attention alert to the driver may further be based on the gaze duration.

In the example method, the issuing the attention alert to the driver may further include issuing the attention alert to the driver if the driver is classified as performing the driving task and if the gaze duration exceeds a gaze duration threshold.

The example method may further comprise, if the gaze location corresponds to a rear-facing mirror, determining a plurality of gaze durations during a gaze accumulation period, wherein the issuing the attention alert to the driver further includes issuing (263) the attention alert to the driver if the driver is classified as performing the driving task and if a sum of the plurality of gaze durations during the gaze accumulation period exceeds a gaze accumulation threshold.

In the example method, the issuing the attention alert to the driver may further include issuing a base attention alert if one of a plurality of base attention alert conditions is met, the plurality of base attention alert conditions comprising at least a first base alert condition and a second base alert condition, the first base alert condition comprising the driver being classified as performing the driving task and the gaze duration exceeding the gaze duration threshold or the sum of the plurality of gaze durations during the gaze accumulation period exceeding the gaze accumulation threshold and the second base alert condition comprising the driver being classified as performing the non-driving task, and issuing an elevated attention alert if one of a plurality of elevated attention alert conditions is met, the plurality of elevated attention alert conditions comprising at least a first elevated attention alert condition, the first elevated attention alert condition comprising the driver being classified as performing the non-driving task and the gaze duration exceeding the gaze duration threshold or the sum of the plurality of gaze durations during the gaze accumulation period exceeding the gaze accumulation threshold.

An example automotive control unit comprises at least one processing unit and a memory coupled to the at least one processing unit and configured to store machine-readable instructions, wherein the machine-readable instructions cause the at least one processing unit to determine a gaze location of a driver of a vehicle; and if the gaze location corresponds to a rear-facing mirror, determine a field of view of the rear-facing mirror, if the field of view corresponds to a view of a driving environment of the vehicle, classify the driver as performing a driving task; if the field of view corresponds to a view of the vehicle, classify the driver as performing a non-driving task; and issue an attention alert to the driver based on the classification of the driver.

In the example automotive control unit, the machine-readable instructions may further cause the at least one processing unit to perform any of the example method discussed above.

An example vehicle comprises any of the example automotive control units discussed above.

The preceding description has been provided to illustrate monitoring the attention of a driver. It should be understood that the description is in no way meant to limit the scope of the present disclosure to the precise embodiments discussed throughout the description. Rather, the person skilled in the art will be aware that the examples of the present disclosure may be combined, modified or condensed without departing from the scope of the present disclosure as defined by the following claims.

LIST OF REFERENCE SIGNS

100 rear-facing mirror
110 front seat head rest
120 rear seat(s)
130 rear seat head rest
140 vehicle ceiling
150 auxiliary mirror
150F auxiliary mirror fastening means
160 front seat
170 door handle
200 method
210-265 method steps
300 vehicle
310 automotive sensor
320 light
330 interior sensor
400 automotive control unit
410 CPU
420 GPU
420*c* connection
430 automotive processing system
440 memory
450 removable storage
460 storage
470 cellular interface
480 GNSS interface
490 communications interface

What is claimed is:

1. A method for monitoring an attention of a driver of a vehicle, comprising:

determining a gaze location of a driver of the vehicle;

when the gaze location corresponds to a rear-facing mirror, determining a field of view of the rear-facing mirror;

when the field of view corresponds to a view of a driving environment of the vehicle, classifying the driver as performing a driving task;

when the field of view corresponds to a view of the vehicle, classifying the driver as performing a non-driving task; and issuing an attention alert to the driver based on the classification of the driver, wherein the field of view corresponds to the view of the driving environment of the vehicle if the field of view includes less of the view of the vehicle than a vehicle view threshold.

2. The method of claim 1, further comprising:

when the gaze location corresponds to the rear-facing mirror:

detecting an occupancy state of each of a plurality of rear seats of the vehicle, each occupancy state indicating an occupancy of each corresponding rear seat; and classifying the driver as performing the driving task if each occupancy state indicates that none of the rear seats of the plurality of rear seats is occupied.

3. The method of claim 2, further comprising:

foregoing determining the field of view if each occupancy state indicates that none of the rear seats of the plurality of rear seats is occupied.

4. The method of claim 1, wherein the determining the field of view of the rear-facing mirror comprises detecting an auxiliary mirror within the field of view of the rear-facing mirror, the auxiliary mirror having an auxiliary field of view including at least one rear seat; and the method further comprises classifying the driver as performing the non-driving task even if the field of view corresponds to the view of the driving environment of the vehicle if the auxiliary mirror is detected.

5. The method of claim 1, wherein the issuing of the attention alert to the driver includes issuing the attention alert to the driver if the driver is classified as performing the non-driving task.

6. The method of claim 1, further comprising:

when the gaze location corresponds to the rear-facing mirror, determining a gaze duration, the gaze duration corresponding to a time interval during which the gaze location corresponds to the rear-facing mirror, wherein the issuing of the attention alert to the driver is further based on the gaze duration.

7. The method of claim 6, wherein the issuing of the attention alert to the driver further includes issuing the attention alert to the driver if the driver is classified as performing the driving task and if the gaze duration exceeds a gaze duration threshold.

8. The method of claim 6, further comprising:

when the gaze location corresponds to the rear-facing mirror, determining a plurality of gaze durations during a gaze accumulation period, wherein the issuing of the attention alert to the driver further comprises issuing the attention alert to the driver if the driver is classified as performing the driving task and if a sum of the plurality of gaze durations during the gaze accumulation period exceeds a gaze accumulation threshold.

9. The method of claim 6, wherein the issuing of the attention alert to the driver further comprises:

issuing a base attention alert if one of a plurality of base attention alert conditions is met, the plurality of base attention alert conditions comprising at least a first base alert condition and a second base alert condition, the first base alert condition comprising the driver being classified as performing the driving task and the gaze duration exceeding the gaze duration threshold or the sum of the plurality of gaze durations during the gaze accumulation period exceeding the gaze accumulation threshold and the second base alert condition comprising the driver being classified as performing the non-driving task; and issuing an elevated attention alert if one of a plurality of elevated attention alert conditions is met, the plurality of elevated attention alert conditions comprising at least a first elevated attention alert condition, the first elevated attention alert condition comprising the driver being classified as performing the non-driving task and the gaze duration exceeding the gaze duration threshold or the sum of the plurality of gaze durations during the gaze accumulation period exceeding the gaze accumulation threshold.

10. An automotive control unit, comprising:

at least one processing unit; and a memory coupled to the at least one processing unit and configured to store machine-readable instructions, wherein the machine-readable instructions cause the at least one processing unit to:

determine a gaze location of a driver of a vehicle; and when the gaze location corresponds to a rear-facing mirror:

determine a field of view of the rear-facing mirror;

when the field of view corresponds to a view of a driving environment of the vehicle, classify the driver as performing a driving task;

when the field of view corresponds to a view of the vehicle, classify the driver as performing a non-driving task; and issue an attention alert to the driver based on the classification of the driver, wherein the field of view corresponds to the view of the driving environment of the vehicle if the field of view includes less of the view of the vehicle than a vehicle view threshold.

11. The automotive control unit of claim 10, wherein the machine-readable instructions further cause the at least one processing unit to:

when the gaze location corresponds to the rear-facing mirror:

detect an occupancy state of each of a plurality of rear seats of the vehicle, each occupancy state indicating an occupancy of each corresponding rear seat; and classify the driver as performing the driving task if each occupancy state indicates that none of the rear seats of the plurality of rear seats is occupied.

12. The automotive control unit of claim 11, wherein the machine-readable instructions further cause the at least one processing unit to:

foregoes determining the field of view if each occupancy state indicates that none of the rear seats of the plurality of rear seats is occupied.

13. The automotive control unit of claim 10, wherein the machine-readable instructions further cause the at least one processing unit to:

detect an auxiliary mirror within the field of view of the rear-facing mirror, the auxiliary mirror having an auxiliary field of view including at least one rear seat; and classify the driver as performing the non-driving task even if the field of view corresponds to the view of the driving environment of the vehicle if the auxiliary mirror is detected.

14. The automotive control unit of claim 10, wherein the machine-readable instructions further cause the at least one processing unit to:

when the gaze location corresponds to a rear-facing mirror, determine a gaze duration, the gaze duration corresponding to a time interval during which the gaze location corresponds to the rear-facing mirror, and issue the attention alert to the driver further based on the gaze duration.

15. The automotive control unit of claim 14, wherein the machine-readable instructions further cause the at least one processing unit to:

issue the attention alert to the driver if the driver is classified as performing the driving task and if the gaze duration exceeds a gaze duration threshold.

16. The automotive control unit of claim 14, wherein the machine-readable instructions further cause the at least one processing unit to:

when the gaze location corresponds to a rear-facing mirror, determine a plurality of gaze durations during a gaze accumulation period, and issue the attention alert to the driver if the driver is classified as performing the driving task and if a sum of the plurality of gaze durations during the gaze accumulation period exceeds a gaze accumulation threshold.

17. The automotive control unit of claim 16, wherein the machine-readable instructions further cause the at least one processing unit to:

issue a base attention alert if one of a plurality of base attention alert conditions is met, the plurality of base attention alert conditions comprising at least a first base alert condition and a second base alert condition, the first base alert condition comprising the driver being classified as performing the driving task and the gaze duration exceeding the gaze duration threshold or the sum of the plurality of gaze durations during the gaze accumulation period exceeding the gaze accumulation threshold and the second base alert condition comprising the driver being classified as performing the non-driving task; and issue an elevated attention alert if one of a plurality of elevated attention alert conditions is met, the plurality of elevated attention alert conditions comprising at least a first elevated attention alert condition, the first elevated attention alert condition comprising the driver being classified as performing the non-driving task and the gaze duration exceeding the gaze duration threshold or the sum of the plurality of gaze durations during the gaze accumulation period exceeding the gaze accumulation threshold.

18. A vehicle comprising the automotive control unit of claim 10.

* * * * *